(12) United States Patent
Nuzman et al.

(10) Patent No.: US 7,809,265 B2
(45) Date of Patent: Oct. 5, 2010

(54) MULTI-HOP OPTICAL COMMUNICATION NETWORK

(75) Inventors: Carl Jeremy Nuzman, Union, NJ (US); Indra Widjaja, Florham Park, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 807 days.

(21) Appl. No.: 11/228,371

(22) Filed: Sep. 16, 2005

(65) Prior Publication Data
US 2006/0257146 A1 Nov. 16, 2006

Related U.S. Application Data

(63) Continuation-in-part of application No. 11/126,024, filed on May 10, 2005, now abandoned.

(51) Int. Cl.
*H04J 14/00* (2006.01)
(52) U.S. Cl. .............................. 398/47; 398/48; 398/52
(58) Field of Classification Search .................. 398/47, 398/48, 52
See application file for complete search history.

(56) References Cited

U.S. PATENT DOCUMENTS 6,735,393 B1 * 5/2004 Zouganeli .................... 398/48

| 2002/0131114 | A1* | 9/2002 | Yoo | 359/124 |
|---|---|---|---|---|
| 2004/0218622 | A1 | 11/2004 | Kumaran et al. | |
| 2004/0218922 | A1* | 11/2004 | Giles et al. | 398/57 |
| 2005/0190770 | A1 | 9/2005 | Saniee et al. | 370/395.4 |

OTHER PUBLICATIONS

Ross, K. et al., "*Scheduling Bursts in Time-Domain Wavelength Interleaved Networks*," IEEE Journal on Selected Areas in Communications, vol. 21, No. 9, pp. 1441-1451, Nov. 2003.
PCT International Search Report dated Sep. 5, 2006, 3 pages, (PCT/US2006/016540) 3 pages.
Ross, K. et al., Scheduling bursts in time-domain wavelength interleaved networks, *IEEE Journal on Selected Areas in Communications*, 21(9):1441-1451, Nov. 2003.
Widjaja, I. et al., "Light core and intelligent edge for a flexible, thin-layered, and cost effective optical transport network," *IEEE Optical Communications*, pp. S30-S36, May 2003.
Widjaja, I. et al, "Simplified layering and flexible bandwidth with TWIN," In Proc. *SIGCOMM FDNA* Workshop, 8 pages, 2004.
Saniee, I. et al., "A new optical network architecture that exploits joint time and wavelength interleaving," In Proc. *Optical Fiber Communications Conf. OFC'04*, TuH4, 3 pages, 2004.

(Continued)

*Primary Examiner*—Nathan M Curs
(74) *Attorney, Agent, or Firm*—A. Yip

(57) ABSTRACT

An apparatus includes a time-domain wavelength-interleaved optical network that connects a plurality of edge nodes. Each of the edge nodes is configured to receive optical communications from others of the edge nodes on an associated wavelength-channel. The number of edge nodes is larger than the number of the wavelength-channels.

20 Claims, 7 Drawing Sheets

OTHER PUBLICATIONS

Gripp, J. et al., Demonstration of synchronous traffic transport over a time-multiplexed WDM ring. In *Proc. Optical Fiber Communications Conf. OFC'04*, PDP6, 3 pages, 2004.

White, I.M. et al., "Demonstration and system analysis of the HORNET architecture," *Journal of Lightwave Technology*, 21(11):2489-2498, Nov. 2003.

Huang, N-F. et al., A novel all-optical transport network with time-shared wavelength channels. *IEEE Journal on Selected Areas in Communications*, 18(10):1863-1875, Oct. 2000.

Mukherjee, B., WDM-based local lightwave networks part I: Single-hop systems. IEEE Network, pp. 12-27, May 1992.

Mukerjee, B., WDM-based local lightwave networks, part II: Multihop systems, *IEEE Network*, pp. 20-32, Jul. 1992.

Barry, R.A. et al., "On the number of wavelengths and switches in all-optical networks," *IEEE Transactions on Communications*, 42(2/3/4):583-591, Feb. 1994.

Lee, K-C. et al., "A wavelength-convertible optical network," *Journal of Lightwave Technology*, 11(5/6):962-970, May/Jun. 1993.

U.S. Appl. No. 11/072,163, filed Mar. 4, 2005, Brzezinski et al.

Chlamtac, I. et al., "Lightpath (wavelength) routing in large WDM networks," *IEEE Journal on Selected Areas in Communications*, 14(5):909-913, Jun. 1996.

Jukan, A. et al., "Service-specific resource allocation in WDM networks with quality constraints," *IEEE Journal on Selected Areas in Communications*, 18(10):2051-2061, Oct. 2000.

Kumaran, K. et al., "Wavelength assignment for partially transparent networks with reach constraints," *Journal of Optical Networking*, vol. 2 No. 8, 20 pages, Aug. 2003.

Zegura, E.W. et al., "How to model an internetwork," In *Proc. INFOCOM'96*, 5c.1.1 to 5c.1.9, 1996.

Nuzman, C. et al., "Design and Performance Evaluation of Scalable TWIN Networks," 2005 IEEE Workshop on *High Performance Switching and Routing*, Hong Kong, China, pp. 152-156, May 12-14, 2005.

White, I.M. et al., "A summary of the HORNET project: A next-generation metropolitan area network," IEEE Journal on Selected Areas in Communications, 21(9):1478-1494, Nov. 2003.

\* cited by examiner

FIG. 8

$$T = \begin{bmatrix} R\downarrow & W\downarrow & B\downarrow & G\downarrow & Y\downarrow \\ 0 & 0.012 & 0.053 & 0.024 & 0.111 \\ 0.085 & 0 & 0.091 & 0.034 & 0.057 \\ 0.102 & 0.010 & 0 & 0.075 & 0.143 \\ 0.122 & 0.087 & 0.094 & 0 & 0.104 \\ 0.028 & 0.043 & 0.023 & 0.202 & 0 \end{bmatrix}$$

↓ 1st ITERATION

MERGED $$\begin{bmatrix} R\downarrow & W\downarrow & B\downarrow & W\downarrow & Y\downarrow \\ 0 & 0 & 0.053 & 0.024 & 0.111 \\ 0.085 & 0 & 0.091 & 0.034 & 0.057 \\ 0.102 & 0 & 0 & 0.075 & 0.143 \\ 0.122 & 0.087 & 0.094 & 0 & 0.104 \\ 0.028 & 0 & 0.023 & 0.202 & 0 \end{bmatrix}$$

↓ 2nd ITERATION

MERGED $$\begin{bmatrix} R\downarrow & W\downarrow & W\downarrow & W\downarrow & Y\downarrow \\ 0 & 0 & 0.053 & 0 & 0.111 \\ 0.085 & 0 & 0.091 & 0 & 0.057 \\ 0.102 & 0 & 0 & 0.075 & 0.143 \\ 0.122 & 0 & 0.094 & 0 & 0.104 \\ 0.028 & 0 & 0 & 0.202 & 0 \end{bmatrix}$$

MULTI-HOP OPTICAL COMMUNICATION NETWORK

This is a continuation-in-part application of application Ser. No. 11/126,024, filed May 10, 2005 now abandoned.

BACKGROUND

1. Field of the Invention

The invention relates generally to optical communication networks, e.g., time-domain wavelength interleaved networks.

2. Discussion of the Related Art

FIG. 1 schematically shows an exemplary conventional Time-domain Wavelength Interleaved Network (TWIN) 10. The TWIN 10 includes a passive optical network (PON) 12 that physically interconnects a number of edge nodes 14. The PON 12 has a plurality of internal nodes 16. Each internal node 16 has an optical cross-connect (OXC) that is configured to passively route optical communications between a plurality of optical transmission fibers 18 based solely on wavelength. Each edge node 14 includes a wavelength-tunable optical transceiver (not shown). Thus, the edge nodes 14 serve as sources and destinations for optical communications carried between end users by the TWIN.

In the TWIN 10, each wavelength-channel is uniquely assigned to one of the edge nodes 14 for receiving optical communications. Then, a source edge node 14 transmits an optical communication to a desired edge node 14 by simply transmitting the optical communication to the PON 12 on the wavelength-channel that has been assigned to the desired edge node 14. The PON 12 routes the optical communication to a desired destination edge node 14 based solely on the wavelength of the optical communication. To transmit to a second destination edge node 14, the source edge node 14 simply resets the transmission wavelength of its optical transceiver to the wavelength-channel that has been assigned to the second destination edge node 14.

Thus, the PON 12 handles routing of optical communications automatically. That is, optical communications do not need label or address headers to enable routing. The wavelength alone ensures that one of the optical communications will be routed to the desired destination edge node 14.

For that reason, the PON 12 does not have hardware support for buffering optical communications at its internal nodes 16. The internal nodes 16 automatically and immediately route received optical communications towards their destination nodes. Furthermore, the OXCs of the PON 12 can simultaneously route multiple optical communications so that collisions between different optical communications do not cause information loss at the internal nodes 16 of the PON 12. In particular, a collision between two optical communications will cause a collision at one of the destination edge nodes 14. Thus, scheduling optical communications to not have overlapping arrival times at the destination edge nodes 14 typically avoids such collisions.

In particular, the PON 12 implements a topology of directed trees in which each edge node 14 is a root of a corresponding one of the trees. Each directed tree routes received optical communications via associated internal nodes 16 to the tree's root, i.e., the destination edge node 14. In such a topology, contention between optical communications occurs at the destination edge nodes 14. To reduce such destination contention, source edge nodes 14 schedule transmissions of optical communications as bursts and interleave bursts to different destination edge nodes.

BRIEF SUMMARY

Assigning a reception wavelength-channel to a single edge node limits the number of edge nodes to the number of available wavelength-channels. Herein, various embodiments of TWINs assign a reception wavelength-channel to more than one edge node. Thus, the TWINs have more edge nodes than the available number of wavelength-channels. Such configurations can enable scaling of the number of edge nodes without the high expense of increasing the number of available wavelength-channels.

One embodiment features an apparatus. The apparatus includes a time-domain wavelength-interleaved optical network that connects a plurality of edge nodes. Each of the edge nodes is configured to receive optical communications from others of the edge nodes on an associated wavelength-channel. The number of edge nodes is larger than the number of the wavelength-channels.

A second embodiment also features an apparatus including an optical network and a plurality of edge nodes interconnected by the optical network. Each edge node has an associated wavelength-channel. The optical network is configured to route optical communications from some source ones of the edge nodes to destination ones of the edge nodes in response to the communications being on the wavelength-channels associated with the destination ones of the edge nodes. The number of edge nodes is larger than the number of the wavelength-channels.

A third embodiment features a method of transmitting communications across a TWIN. The method includes performing a first routing of a communication from a source node to a second node via an optical network of a TWIN based on a carrier wavelength of the communication. The method includes determining whether the second node is a destination of the communication from routing data carried in the optical communication. The routing data is supplemental to the wavelength-channel of the communication in the optical network. The method includes performing a second routing of the communication from the second node to a third node via an optical network of the TWIN in response to determining that the second node is not the destination of the communication.

BRIEF DESCRIPTION OF THE DRAWINGS

Various illustrative embodiments are described more fully by the Figures and below description. Nevertheless, the inventions may be embodied in various forms and are not limited to embodiments described in the Figures and Detailed Description of Illustrative Embodiments.

FIG. 8 illustrates how a color merging process transforms an exemplary traffic matrix;

FIG. 9b illustrates a portion of an auxiliary graph associated with the TWIN of FIG. 9a.

In the Figures and text, like reference numerals indicate elements with similar functions.

DETAILED DESCRIPTION OF ILLUSTRATIVE EMBODIMENTS

Herein, for simplicity, we sometimes use color to refer to wavelength. Color may refer to wavelengths of visible, infrared, or ultraviolet light.

Figure 1:
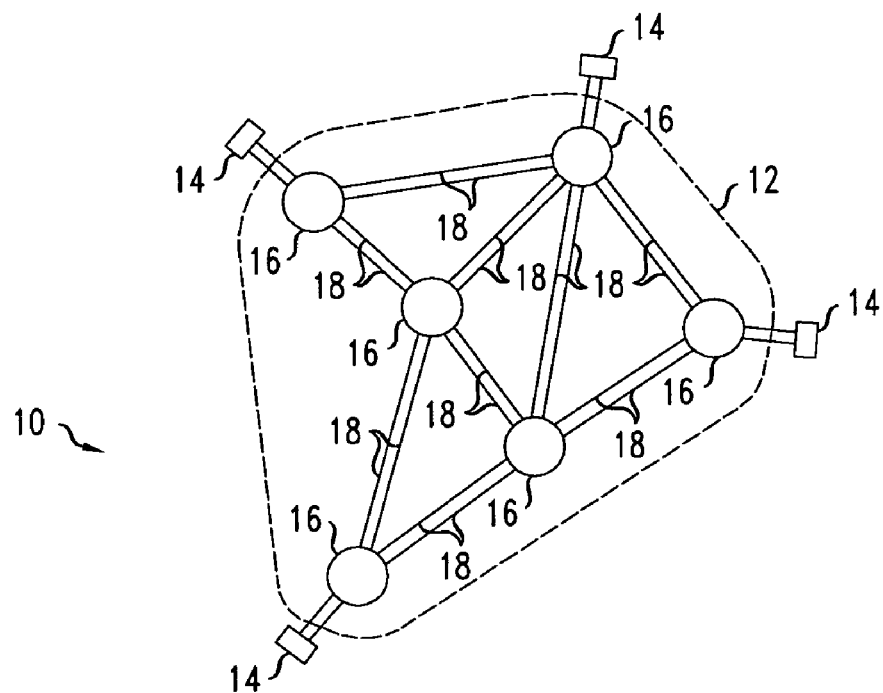
FIG. 1 illustrates a conventional time-domain interleaved network (TWIN)
Figure 2:
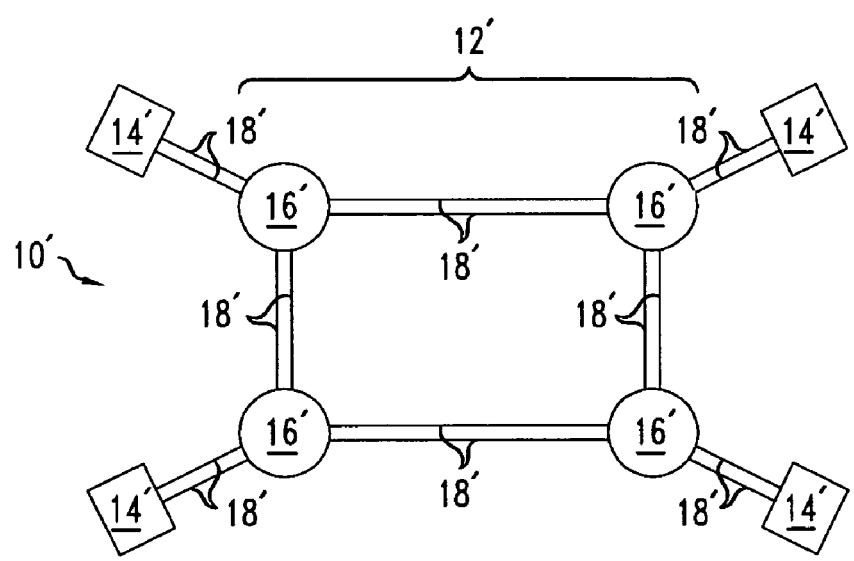
FIG. 2 illustrates an exemplary embodiment of a TWIN.

Referring to FIG. 2, exemplary TWIN 10' includes a passive optical network (PON) 12' and a plurality of edge nodes 14' that are interconnected by the PON 12'. The PON 12' passively routes optical communications between edge nodes 14' based solely on the wavelengths of the optical communications. The PON 12' includes optical fiber transmission paths 18' and internal nodes 16'. Each edge node 14' has a multi-channel optical transceiver for transmitting and receiving optical communications.

Figure 3:
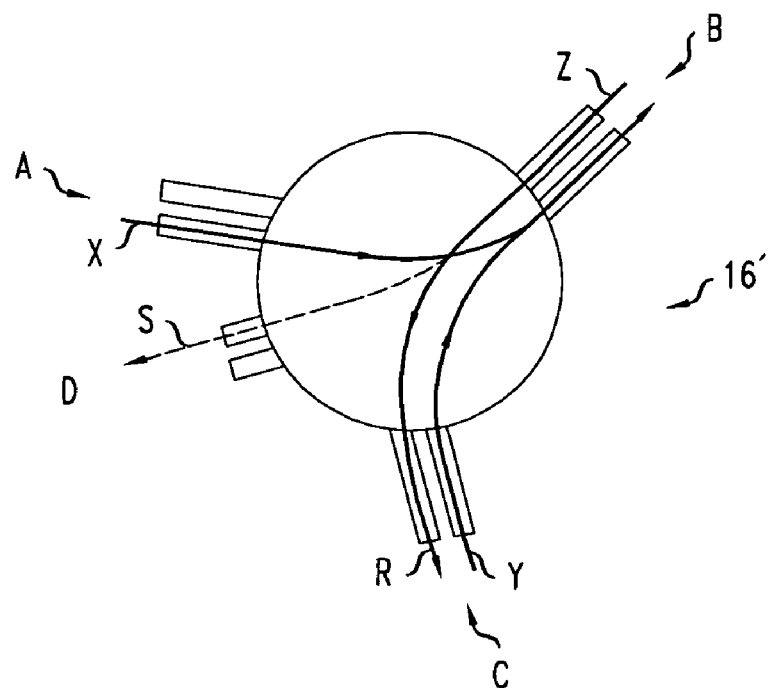
FIG. 3 illustrates an exemplary configuration of an internal node of the TWIN of FIG. 2.

FIG. 3 schematically shows how light paths X, Y, and Z are transformed by an exemplary internal node 16' of the TWIN 10' shown in FIG. 2. The exemplary internal node 16' passively routes light of optical communications between optical ports A, B, C, and D based on wavelength. Each of the optical ports A, B, C, and D connects to paired input and output optical fiber transmission paths 18', which in turn connect to other internal or edge nodes 14' (not shown). For ones of the optical ports A-D that connect to an edge node 14', the exemplary internal node 16' functions as an optical add/drop multiplexer (OADM). For ones of the optical ports A-D that connect to other edge nodes 14', the exemplary internal node 16' functions as an optical cross-connect (OXC).

The internal node 16' may merge incoming light paths that carry light of the same wavelength, e.g., light paths X and Y. The internal node 16' does not however, split an incoming light path so that received light of one wavelength is directed to more than one output optical ports in the TWIN 10'. For example, splitting light path Z between light path R and potential light path S is forbidden.

Figure 4:
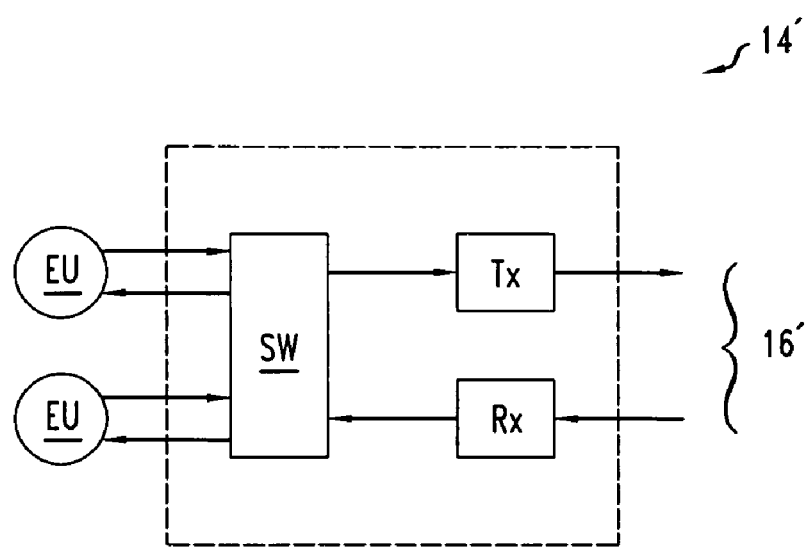
FIG. 4 illustrates one of the edge nodes of the TWIN of FIG. 2.

FIG. 4 schematically shows an exemplary one of the edge nodes 14' of FIG. 2. The exemplary edge node 14' includes a wavelength-tunable optical transmitter, Tx, a fixed-wavelength optical receiver Rx, and an electronic switch (SW) that connects the optical receiver Rx to the optical transmitter Tx and one or more end users (EUs). The optical transmitter Tx is tunable to transmit light on the wavelength-channels assigned to neighboring ones of the edge nodes 14'. Herein, the neighbors of a selected edge node are the other edge nodes that can directly receive optical communications from the optical transmitter Tx of a selected edge node via the PON 12'. The optical receiver Rx is configured to receive optical communications at a single wavelength-channel that is assigned to the associated edge node 14'. The electronic switch (SW) electronically routes a received communication from the receiver Rx to either one or more of the local end users (EUs) or to the local transmitter Tx. That is, the electronic switch SW performs local routing of the communication after conversion from optical to electrical form. The electronic switch SW makes this local routing decision based on supplementary routing data from the received communication, i.e., data additional to wavelength-channel of the received optical communication. The supplementary routing data determines whether the local edge node is the final destination or only an intermediate edge node for the particular communication.

Referring again to FIG. 2, the PON 12' passively routes optical communications to edge nodes 14' based solely on the wavelength-channels of the optical communications therein. Nevertheless, in the TWIN 10', multiple edge nodes 14' are assigned to the same wavelength. That is, the TWIN 10' has more edge nodes 14' than available wavelength-channels. For these reasons, one or more of the edge nodes 14' is not able to directly communicate with one or more others of the edge nodes 14' solely via optical routing performed by the PON 12'.

Instead, in the TWIN 10', a source edge node 14' may only send optical communications directly via the PON 12' to an associated set of "neighbor" edge nodes 14'. Herein, such direct all-optical transmissions via a PON are referred to as single-hop transmissions. The source edge node 14' sends communications to the other edge nodes 14' of the TWIN indirectly via one or more intermediate edge nodes 14', i.e., via multiple hop transmissions. The intermediate edge nodes 14' function as destinations for single-hop optical communications and as gateways for multiple-hop optical communications. As gateways, the intermediate edge nodes 14' retransmit received optical communications so that such communications can perform one or more other hops through the PON 12'. Such added hops route such communications to edge nodes 14' that are not neighbors of the original source edge node 14'. During the second or higher hops, an optical communication may be on the same wavelength-channel as the original optical communication or be on a different wavelength-channel. In particular, the wavelength of the communication during the second hop depends on the wavelength-assignment of the second destination edge node 12' rather than the wavelength-channel of the original optical communication.

In various embodiments of TWINs, a communication may make one, two, or more hops across the TWIN's PON prior to arriving at its final destination edge node. While the TWIN's PON interconnects the edge nodes, the PON itself may or may not be connected.

Figure 5:
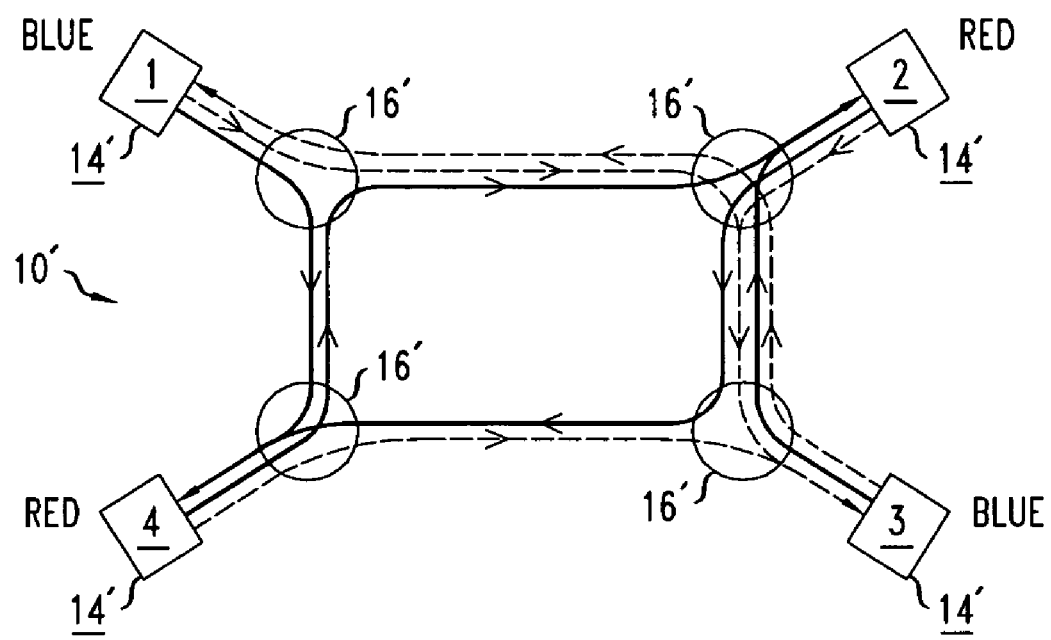
FIG. 5 shows the light paths of a specific embodiment of the TWIN shown in FIG. 2.

FIG. 5 shows the light paths associated with single hops for a specific embodiment of the TWIN 10' shown in FIG. 2. In the specific embodiment, each edge node 14', i.e., labeled 1, 2, 3, and 4 for convenience, transmits optical communications on two wavelength-channels, i.e., channels referred to as red and blue, respectively. In this specific embodiment, the edge nodes 1 and 3 are assigned the destination color blue, and the edge nodes 2 and 4 are assigned the destination color red. For these color assignments, the single-hop light paths for red and blue light are shown in FIG. 5 with solid and dotted directed lines, respectively. For this set of single-hop light paths, the neighbors of edge nodes 1, 2, 3, and 4 are given by the respective sets of nodes {3, 4}, {3, 4}, {1, 2}, and {2, 3}. Then, two-hop transmissions of communications from edge node 1 to edge node 2, from edge node 2 to edge node 1, from edge node 3 to edge node 4, and from edge node 4 to edge node 1, is possible if the intermediate edge nodes are selected from the respective sets {3, 4}, {3}, {1, 2}, and {3}, respectively.

The set of intermediate edge nodes 14' selectively function as either a gateway or a destination in response to receiving an optical communication from the PON 12'. For that reason, these edge nodes 14' support a selection/switching function whose outcome depends on the form of the received optical communication, e.g., the function performed by the intelligent electronic switch (SW) of FIG. 4. In particular, optical communications carry supplementary routing data that intermediate edge nodes 14' use to decide whether to operate as a gateway node or as a destination node, i.e., to drop the communication to a local end user. The supplementary routing data is needed, because the wavelength-channel of a communication does not uniquely determine the communication's destination when the number of available wavelength-channels is less than the number of available destinations.

The optical communications may carry the supplementary routing data as a header or temporal pulse sequence. The supplementary routing data may include the entire sequence of intermediate edge nodes 14' to be traversed, i.e., as determined by the original source edge node 14'. In the alternative, the supplementary routing data may include only the identity of the final destination edge node 14' or the identities of the final destination and original source edge nodes 14'. The intermediate edge node 14' has intelligent circuitry to read the supplementary routing data, determine the form of next hop from the data, and send data representative of the identity of the next receiving edge node 14' to the local optical transmitter. The local optical transmitter uses the data representative of the identity of the next receiving edge node 14' to reconvert the communication to an optical form on wavelength-channel appropriate for the next hop through the PON 12'.

A TWIN has a virtual topology that is defined by the single-hop structure of the network. Herein, a virtual topology is a graph of directed arcs that is formed on edge nodes of the TWIN. The graph includes a directed arc from edge node "a" to edge node "b" if and only if edge node "a" can transmit an optical communication to edge node "b" via a single hop.

Figure 6:
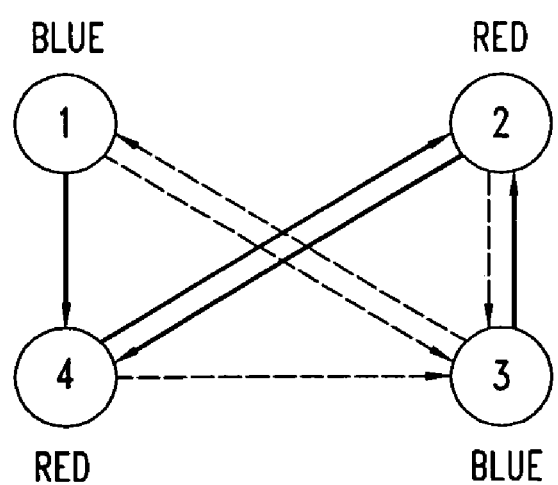
FIG. 6 shows the virtual topology associated with the specific embodiment of a TWIN as shown in FIG. 5.

The virtual topology of a conventional TWIN is a fully connected directed graph in which a pair of oppositely directed arcs connects each pair of edge nodes, because any edge node of such a TWIN can optically transmit a communication to any other edge node by a single-hop. In contrast, embodiments of TWINs herein do not have fully connected virtual topologies, because they have more edge nodes than the number of available wavelength-channels. Since they have more edge nodes than wavelength-channels, a given edge node cannot transmit a communication to, at least, one other edge node via a single hop process. An example of a non-fully connected virtual topology is the virtual topology for the TWIN of FIG. 5, which is shown in FIG. 6.

While the above-description has been limited to particular embodiments of TWINs, the invention is intended to include other embodiments. For example, the PON may have different numbers of internal nodes and/or optical fiber paths, internal nodes with different numbers of ports, different physical topologies, and different routing configurations at internal nodes. Also, the edge nodes may have different assignments of wavelength-channels and/or optical transceivers with different numbers of available wavelength-channels. In addition, the TWINs may be configured to implement different virtual topologies.

Figure 7:
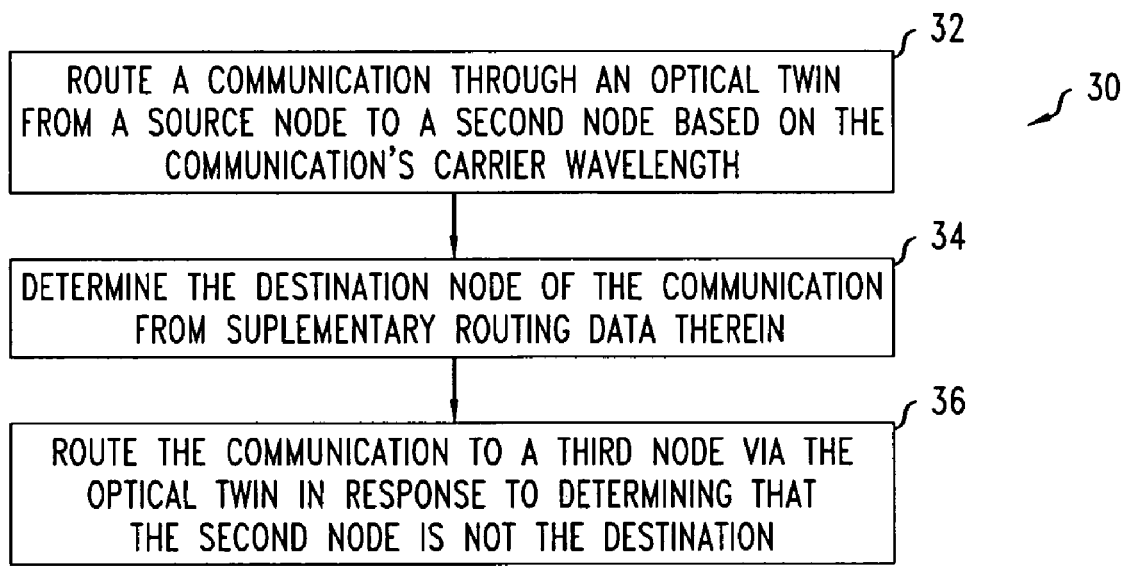
FIG. 7 is a flow chart for a method of transmitting communications across a connected TWIN, e.g., the TWIN of FIG. 2.

FIG. 7 illustrates a method 30 for transmitting communications across a connected network. Examples of the network include TWIN 10' of FIG. 2 and other networks that include a PON and a set of edge nodes inter-connected by the PON, wherein one or more of the edge nodes functions as a gateway for the PON.

The method 30 includes performing a first routing of a communication via an optical network, e.g., of a TWIN, from a source node to a second node based solely on the carrier wavelength of the communication (step 32). The method 32 includes determining at the second node whether the destination node of the communication is the second node (step 34). The determining step includes reading and analyzing routing data carried in the optical communication. The read routing data is supplementary to the wavelength-channel of the received optical communication in the optical network. The method 30 includes performing a second routing of the communication from the second node to a third node via the optical network in response to determining that the second node is not the destination of the communication (step 36). In the second routing step, the optical network routes the communication solely based on its carrier wavelength, which may be the same or different than the carrier wavelength of the optical communication originally received at the second node. The step of performing a second routing may include dropping the communication to an edge node that is directly connected to the second node in response to determining that the second node is the destination of the communication.

In various embodiments of TWINs, processing of a received communication by an intermediate edge node may require more time and/or be more costly than the optical routing of the communication through a single hop over the PON. Thus, it may be possible to increase the total throughput and/or reduce the total cost by configuring a TWIN to approximately maximize single-hop throughputs therein.

Several methods are available to design the configuration of a TWIN in a manner that approximately maximizes single-hop throughputs based on a given traffic matrix. In a traffic matrix, T, element $T_{a,b}$ defines the traffic that is carried from source edge node "a" to destination edge node "b". The various design methods produce configurations of a TWIN that respect a given physical architecture, i.e., a physical topology of a PON and connections between the PON and the edge nodes. The various methods involve performing several steps that configure OXCs and OADMs of internal nodes.

The various methods for designing a TWIN involve performing a color assignment step (I), a tree design step (II), and a flow routing step (III). The color assignment step involves assigning a destination wavelength-channel or color to each edge node of the TWIN. The tree design step involves determining a virtual topology compatible with the given physical architecture. In particular, this involves configuring OXCs and OADMs of the PON's internal nodes to define the physical light paths therein and fix the virtual topology. The flow routing step involves determining how traffic flows will be routed onto the virtual topology that is produced by the tree design step. The flow routing step determines how traffic will be distributed among the various intermediate edge nodes.

I. Color Assignment

The color assignment step assigns W destination wavelength-channels, i.e., colors, to the N edge nodes, wherein W and N are defined by the physical architecture and N>W. The color assignment is performed in a manner that approximately maximizes the single-hop throughput as defined by the given traffic matrix, T. That is, the color assignment step approximately maximizes $$\sum_{(a,b)} T_{a,b},$$

wherein the sum is only over node pairs (a, b) that correspond to directed arcs in the virtual topology. The maximization of the single-hop throughput is subject to two constraints. The first constraint is that each edge node can only optically transmit communication traffic to up to W neighbor edge nodes. Thus, in each row of the traffic matrix, not more than W elements will obtain contributions from single-hop traffic. The second constraint is that the W neighbor edge nodes of a selected edge node must be assigned different destination colors. Thus, by associating destination colors to columns of the traffic matrix, one sees that only one entry in a row of the traffic matrix for each column color will obtain a single-hop traffic contribution.

There are several algorithms for implementing the color assignment step.

In one algorithm, color assignments are produced by a color-merge process. The color-merge process starts by assigning a unique color to each column of the traffic matrix and then, merges column-colors in a pair-wise fashion. Each merger is selected so as to produce the smallest sequential loss of single-hop throughput. A column-color merger causes a throughput loss, because each source edge node can only optically transmit to one edge node of a given color. Thus, for each row of the traffic matrix, a merger of two column-colors requires that one of the elements of the columns, whose colors are merged, obtain a zero single-hop traffic contribution. The column-colors to be merged are selected to minimize such losses in single-hop traffic contributions. The merge process is iterated for other pairs of column-colors until only W column-colors remain. Then, the remaining colors of the columns provide the assignments of destination colors to the associated edge nodes.

FIG. 8 illustrates the evolution of the single-hop contribution to the traffic matrix as the color merger process progresses for a TWIN having 5 edge nodes and three wavelength-channels, i.e., colors. In the process, the columns of the traffic matrix, T, are initially assigned the destination colors: red (R), white (W), blue (B), green (G), and yellow (Y). In the first iteration, the process selects to merge column-colors of columns 4 and 2 so that columns 2 and 4 carry color label, W. This choice of column-color merger leads to the smallest sequential loss of throughput. Merging the colors of columns 2 and 4 also requires setting one entry in each row to "0" in a manner that minimizes the sequential loss of single-hop throughput. In the second iteration, the process selects to merge column-colors of columns 3 and columns 2 and 4 so that columns 2-4 carry color label, W. This choice of column-color merger leads to the next lowest sequential loss of throughput. Merging the colors of columns 2, 3, and 4 again requires setting one entry in each row to "0" in a manner that minimizes the sequential loss of single-hop throughput. After this second iteration, the process stops, because only three colors remain. From the resulting column-color assignments, the destination color assignments for the edge nodes 1, 2, 3, 4, and 5 are found to be R, W, W, W, and Y, respectively.

In a second color assignment algorithm, an integer linear programming algorithm produces the color assignments for the edge nodes. The linear programming algorithm uses any conventional method to maximize:

$$\sum_{(a,b)} T_{a,b} Q_{a,b}$$

subject to the constraints:

$$\sum_{k \in W} u_a^k = 1, \sum_{a \in V} \gamma^k(a,b) \leq N u_b^k, \sum_{b \in V} \gamma^k(a,b) = 1, \text{ and } \sum_{k \in W} \gamma^k(a,b) = Q_{ab}.$$

Here, Q is the cross-connect matrix, $u_b^k$ is a binary variable on the directed tree of the virtual topology whose root is edge node "b", $\gamma^k(a, b)$ is a characteristic function for the directed arc of the virtual topology from edge node "a" to edge node "b", W is the set of wavelength-channels, and V is the set of edge nodes of the physical TWIN topology. The matrix element, $Q_{ab}$, equals "1" if a physical light path goes from edge node "a" to edge node "b" and is equal to "0" otherwise. The binary variable $u_b^k$ is equal to "1" if edge node "b" of the virtual topology is assigned the destination color "k" and is otherwise equal to "0". The function $\gamma^k(a,b)$ is equal to "1" if there is a directed arc of the virtual topology from edge node "a" to edge node "b" is configured to carry color "k" and is otherwise equal to "0".

II. Tree Design

The tree design step involves selecting directed light paths of a given physical architecture based on the previous assignment of destination colors to the edge nodes. In the directed trees, each destination edge node is the root of a tree whose leaves are edge nodes that can optically transmit to the destination edge node. The branches of a directed tree are the light paths through the physical architecture from the leaves to the root. Individual branches can merge together as the branches approach the root. For each color-labeled destination edge node, the tree design step sequentially builds a color-labeled directed tree by adding physical nodes to the tree whose root is the destination edge node. The tree design phase tries to find light paths that implement a virtual topology that maximizes single-hop throughputs and obeys physical constraints. The physical constraints may prevent the highest throughput virtual topology from being implemented.

Iterative algorithms are available for forming the directed trees over a given a physical architecture. In these algorithms, each iteration involves selecting a candidate pair of nodes and then, attempting to find a physical light path that connects the pair of nodes in a manner consistent with the existing wavelength-labeled trees. If such a light path is found, a directed light path for the pair is added to an existing tree. When a light path connects edge node "a" to edge node "b", the process includes adding a directed arc from "a" to "b" in the virtual topology. The algorithm is iterated until a virtual topology is obtained in which each edge node connects to W outgoing directed arcs where W is the number of wavelength-channels, i.e., colors.

The algorithm iteratively forms physical light paths by searching for shortest light paths in an auxiliary graph. The light paths are formed by configuring the OXCs and/or OADMs in the internal nodes of the given PON. During the algorithm, the auxiliary graph enforces OXC/OADM constraints such that finite-cost light paths of the auxiliary graph correspond to light paths compatible with existing wavelength-labeled trees. The algorithm selects each node for potentially adding to an existing tree in the order of decreasing traffic matrix elements, $T_{a,b}$. That is, the selection of a potential node to connect to a tree attempts to maximize the sequential increase in single-hop throughput. The algorithm has the following steps.

First, for each color, the algorithm includes setting up a cyclic sequence of physical light paths between the edge nodes of that color. As the cyclic paths are set up, the auxiliary graph is updated to have appropriate cross-connections for the cyclic paths. For each color, the edge node pairs of that color are now considered both routed and not rejected. The step of setting up such cyclic light paths ensures that the final virtual topology will be connected. A simple algorithm is available to help in setting up feasible ones of such cyclic sequences through the auxiliary graphs for each of the colors. To use the algorithm, one considers a directed graph G whose vertices belong to V and whose directed arcs belong to A such that if arc (i, j) is in A so is arc (j, i). Then, one associates a symmetric positive cost, Cij, to each directed arc in A. Given $U \subset V$, the subcycle problem is to find an arc-disjoint cycle in G that covers all of the nodes in U, and the least-cost subcycle problem is to find the cycle with least-cost. Taking U to be the set of edge nodes of one color, said cycle provides a feasible cycle for connecting said edge nodes. To approach the least-cost subcyle problem, one forms an m×m matrix $\{d(i,j)\}_{i,j \subset U}$ where m is the number of elements in U and d(i,j) is the cost of the least-cost path between nodes "i" and "j" in the graph G. Then, one solves the traveling salesman problem (TSP) for the matrix $\{d(i,j)\}$ to obtain a solution to the least-cost subcycle problem. Then, using the shortest paths in G to connect the nodes in U in the order specified by the solution to the TSP produces a feasible subcycle as desired for the edge nodes of that color. Some methods for heuristically solving the TSP search for 2-optimal cycles, i.e., cycles whose length cannot be reduced by inverting a section of the cycle. One way to search for a 2-optimal cycle involves repeatedly searching for favorable inversions of sections of a cycle until an improved 2-optimal solution is obtained. Finding a 2-optimal solution may provide a low complexity method of finding a solution of subcycle problem even if such a solution is not necessarily of least-cost.

Next, the algorithm includes repeatedly executing a loop to produce a set of directed trees such that each edge node is the root of one of the directed trees. The loop includes selecting a remaining edge node pair (i, j) that has the largest traffic matrix element and has not been has not been either routed or rejected. Next, the loop includes finding a least-cost light path of the auxiliary graph from the transmitter at the node "i" to the receiver at the node "j" where the light path has the wavelength assigned to the destination node "j". If the cost of the light path is finite, the light path is kept and a directed arc from "i" to "j" is added in the virtual topology. The loop also includes updating the auxiliary graph to show the physical light path that routes the edge node pair (i, j). If the cost of the light path is infinite, the loop includes marking the edge node pair (i, j) as rejected. The loop is repeated for new edge node pairs of the virtual topology until all edge node pairs are either routed or rejected.

In the above algorithm, using an auxiliary graph enables the construction of physical light paths by configuring OXCs and OADMs to merge common wavelength channels such that the OXCs and OADMs do not split an input wavelength channel between multiple output optical fibers. To construct the auxiliary graph, it is useful to recall that the physical topology of the TWIN may be represented by a directed graph, G(V, A), where V is the set of vertices for the nodes and A is the set of directed edges for the physical optical fibers that connect the nodes. Each edge $(i, j) \in A$ is assigned a weight Cij that defines a cost for using the edge (i, j). The cost may be a measure of the length of the physical link (i, j) or a resource value of the edge, e.g., a cost of building and/or operating the associated physical link, which may include fiber, repeater, and/or amplifier costs. From the graph G(V,A), an auxiliary graph, $G'_w(V', A')$ is created for each wavelength-channel $w \in W$ where W is the set of available wavelength-channels of the TWIN. In the auxiliary graph, each vertex in V' represents an input (or output) optical port of a TWIN node on wavelength channel w, or an add or drop port of a TWIN node. The add and drop ports may represent the transmitter at the source node and receiver at the destination node, respectively.

The transformation for making one of the auxiliary graphs $G'_w$ from the graph G for the physical topology is described as follows. For each edge $(i, j) \in A$ where $i, j \in V$, a corresponding external edge $(v_i^{out}(j), v_j^{in}(i)) \in A'$ is created with a weight Cij where $v_i^{out}(j) \in V'$ denotes the output port at node "i" that is connected to node j and $v_j^{in}(i) \in V'$ denotes the input port at node j that is connected to node i. For each node $k \in V$, corresponding internal edges $(v_k^{in}(i), v_k^{out}(j)) \in A'$ are created with a weight $C_k(i,j)$ where "i" and "j" are neighboring nodes to node k in G. The weight $C_k(i,j)$ functions as a cost for using the internal edge of the node "k" that connects the ports for optical fibers connected to nodes "i" and "j". For each node k connected directly to an edge node, an edge $(v_k^{in}(+), v_k^{out}(j))$ is created to represent the link from the add port (i.e., of the edge node's transmitter) to $v_k^{out}(j)$ for each neighboring node j of node k. Also for each node k connected directly to an edge node, an edge $(v_k^{in}(j), v_k^{out}(-))$ is created to represent the link connecting $v_k^{in}(j)$ to the drop port (i.e., of the edge node's receiver). All internal weights $C_k(*, *)$ are initially set to 0.

The sets of weights, i.e., $\{Cij\}$ and $\{C_k(i,j)\}$, of an auxiliary graph are updated as each new path of the graph's color is added to the tree design. The updates enforce physical constraints. For example, if a light path of wavelength w is added and the light path traverses nodes i, k and j in that order, then the update will set all internal weights of the form $C_k(i,j')$ for $j' \neq j$ to infinity in the auxiliary graph $G'_w$. Such an update prevents the above-described method from adding a subsequent light path of the same wavelength w with a divergent route at node "k" thereby avoiding to split an input light path of one wavelength between two different output ports.

The auxiliary graphs can also be used to minimize resource usage while forming the directed trees of the virtual topology. For example, when a new light path is established to traverse link (i,j), the cost Cij can be set to zero to encourage future paths to merge onto the same multipoint-to-point directed tree.

Figure 9A:
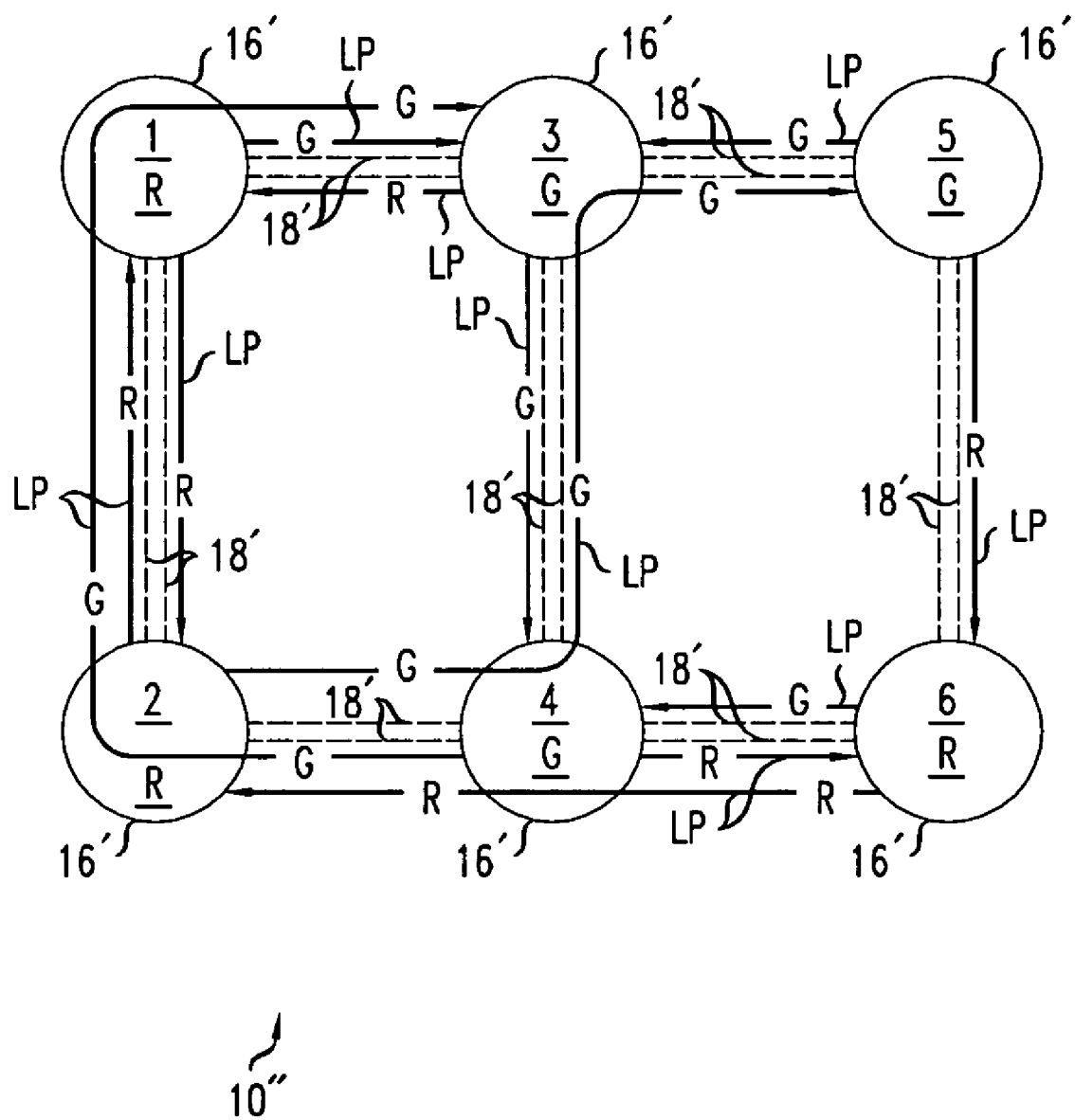
FIG. 9a shows a directed graph that illustrates color-routing in an exemplary TWIN.
Figure 9B:
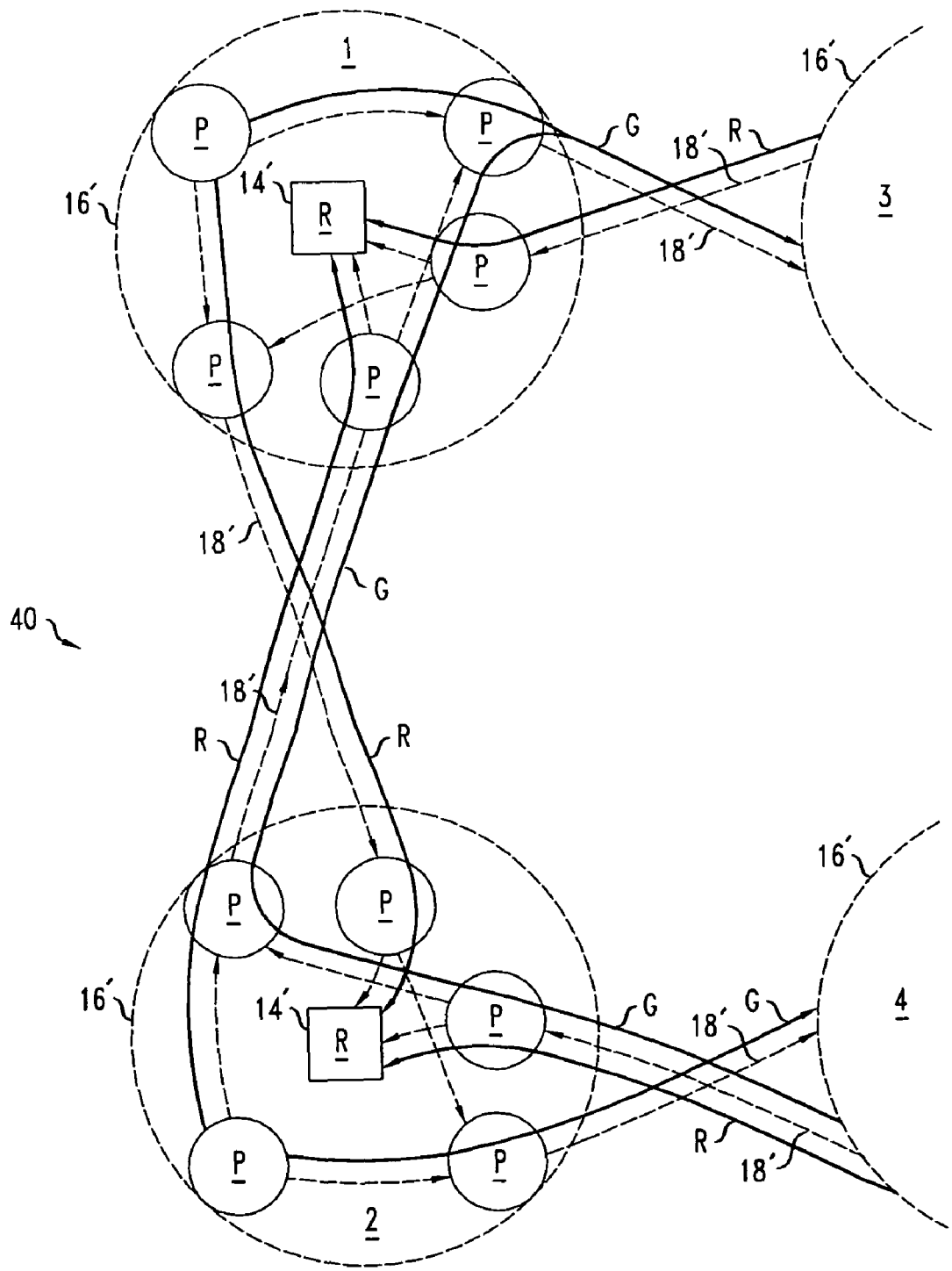

FIGS. 9a-9b illustrate the construction of an auxiliary graph from a directed graph 10" of an exemplary TWIN.

Referring to FIG. 9a, the exemplary TWIN has internal nodes 16', optical fibers 18', and edge nodes (not shown). In the exemplary TWIN, each internal node connects directly to a corresponding edge node. The internal nodes 16' are enumerated as nodes 1, 2, 3, 4, 5, 6 and also labeled by the colors assigned to their corresponding edge nodes, i.e., R or G. The exemplary TWIN supports optical communications on two wavelength-channels, i.e., red (R) and green (G). The physical light paths (LP) for such communications are also shown schematically and labeled the color, i.e., R or G, of the associated directed tree, i.e., colors of the destination edge for the light paths.

FIG. 9b shows a portion 40 of an auxiliary graph for nodes 1 and 2 of the exemplary TWIN 10" shown in FIG. 9a. The auxiliary graph combines both colors for wavelength channels. The portion 40 includes internal nodes 1 and 2 and the corresponding edge nodes 14', which are set in the nodes 1 and 2 for convenience. The portion 40 includes input and output ports (P), i.e., $v^{in}$'s and $v^{out}$'s, and illustrates internal and external physical optical fibers (dotted directed lines). The portion 40 shows the routing of light paths through the ports (P) and to the edge nodes 14'.

III. Flow Routing

Since the tree design step fixes the virtual topology, i.e., $\{Q_{a,b}\}$, the flow routing step determines traffic flows over this fixed virtual topology. In particular, given a source and destination pair, the flow routing step determines percentages of traffic that will be routed between various directed arcs of the virtual topology along paths that can transport communications from the given source to the given destination. Alternatives processes are available for performing the flow routing step.

A first alternative process involves routing flows of communications from source edge nodes to destination edge nodes via the shortest paths. In this alternative, the flow routings are selected to minimize the number of hops needed to go from a source edge node to a destination edge node.

A second alternative process involves defining the flow routings in a manner that approximately minimizes a congestion measure, C. The congestion, C, is taken to be the maximum utilization of any destination edge node. The minimization is performed subject to constraints on the set of real flow variables, i.e., $\{F^s_d(i, j)\}$, wherein $F^s_d(i, j)$ is the traffic flow from source node "s" to destination node "d" over the directed arc of the physical topology, V, from node "i" to node "j". Here, total flows to each destination are less than or equal to "1", because the traffic matrix, T, is normalized by the per wavelength data rate. The real flow variables satisfy the following usual flow constraints:

$$\Sigma_{i \in V} F^s_d(i, k) - \Sigma_{j \in V} F^s_d(k, j) = \{-T_{s,d} \text{ if } k=s, +T_{s,d} \text{ if } k=d, 0 \text{ if } k \neq d \text{ and } k \neq s\}$$

where s, d, i, j, and k are nodes in the physical topology of the TWIN. The real flow variables are also be restricted to be on directed arcs of the virtual topology, which imposes the following constraint: $\Sigma_{s,d \in V} F^s_d(a, b) \leq Q_{a,b}$ for each pair of nodes (a, b) connected by an arc in the virtual topology. Finally, since the congestion, C, is defined as the maximum utilization of any destination edge node, the congestion must satisfy $\Sigma_{s, d, i \in V} F^s_d(i, j) \leq C$ for each physical node $j \in V$. Typically, a standard multi-commodity flow program can be used to determine the set of real flow variables, which minimize C subject to the above constraints. In addition, such methods typically determine the value of C. Provided that the minimum value of C is not greater than "1", the final flow routing design is feasible over the given physical network. Then, the set of associated set of real variables $\{F^s_d(i, j)\}$ provides the flow information that intermediate edge nodes can use to intelligently determine how received traffic should be routed.

From the disclosure, drawings, and claims, other embodiments of the invention will be apparent to those skilled in the art.

What we claim is:

1. An apparatus comprising:
    a time-domain wavelength-interleaved optical network including a plurality of network nodes configured to passively route optical signals between a plurality of edge nodes connected thereto, each of the edge nodes being configured to receive optical communications from others of the edge nodes on an associated wavelength-channel, the number of edge nodes being larger than the number of wavelength-channels;
    wherein one of the edge nodes is configured to determine whether the one of the edge nodes is the final destination edge node or an intermediate edge node for a received one of the optical communications from a certain one of the network nodes based on routing data from the received one of the optical communications, the routing data supplementing a wavelength-channel of the received one of the optical communications; and
    wherein after the one of the edge nodes determines that the one of the edge nodes is an intermediate edge node based on the routing data, the one of the edge nodes is configured to route to the certain network node a second optical communication, which is derivable from the received one of the optical communications from the certain network node.

2. The apparatus of claim 1, wherein at least two of the edge nodes are assigned the same associated wavelength-channel.

3. The apparatus of claim 1, wherein the network nodes passively route optical signals to the edge nodes based on the wavelength-channels of the optical communications.

4. The apparatus of claim 3, wherein one or more of the network nodes include optical cross-connects.

5. The apparatus of claim 1, wherein the one of the edge nodes is configured to optically retransmit the received one of the optical communications to another of the edge nodes on a different second wavelength-channel in response to determining that the one of the edge nodes is an intermediate edge node for the received one of the optical communications.

6. The apparatus of claim 1, wherein each of the edge nodes is capable of transmitting communications to each of the other edge nodes via the time-domain wavelength interleaved network.

7. The apparatus of claim 1, wherein the received one of the optical communications and the second optical communication contain the same information.

8. An apparatus comprising:
    an optical network including a plurality of network nodes; and
    a plurality of edge nodes interconnected by the optical network, each edge node having an associated wavelength-channel, the network nodes being configured to passively route optical communications from some source ones of the edge nodes to destination ones of the edge nodes in response to the communications being on the wavelength-channels associated with the destination ones of the edge nodes, the number of edge nodes being larger than the number of the wavelength-channels; and
    wherein one of the edge nodes is configured to determine whether the one of the edge nodes is the final destination edge node or an intermediate edge node for a received one of the optical communications from a certain one of the network nodes based on routing data from the received one of the optical communications supplementary to a wavelength-channel of the received one of the optical communications; and
    wherein after the one of the edge nodes determines that the one of the edge nodes is an intermediate edge node based on the routing data, the one of the edge nodes is configured to route to the certain network node a second optical communication, which is derivable from the received one of the optical communications from the certain network node.

9. The apparatus of claim 8, wherein at least two of the edge nodes are configured to receive optical communications on the same wavelength.

10. The apparatus of claim 8, wherein at least one of the edge nodes is configured to retransmit some received optical communications to another of the edge nodes on a second wavelength-channel.

11. The apparatus of claim 8, wherein the routing data lists information indicative of the identity of a next intermediate node for the received one of the optical communications.

12. The apparatus of claim 9, wherein the apparatus forms a time-domain interleaved networking architecture.

13. The apparatus of claim 9, wherein each network node has an optical cross-connect that is configured to route optical communications between ports of the associated network node based solely on the wavelengths of the optical communications.

14. The apparatus of claim 8, wherein the received one of the optical communications and the second optical communication contain the same information.

15. A method, comprising:
- performing a first routing of a first optical communication from a source edge node to a second edge node via an optical time-domain wavelength interleaved network based on a carrier wavelength of the optical communication, a plurality of network nodes being provided in the network which are connected to at least the source edge node and the second edge node, the network nodes being configured to passively route the first optical communication through the network;
- determining by the second edge node whether the second edge node is a destination edge node or an intermediate edge node for the first optical communication from a certain one of the network nodes based on supplementary routing data carried in the first optical communication, the supplementary routing data being supplementary to the wavelength of the first optical communication; and
- performing a second routing of a second optical communication from the second edge node to the certain network node through which the second optical communication traverses to a third edge node via an optical time-domain wavelength interleaved network in response to determining that the second edge node is an intermediate node for the first optical communication, wherein the second optical communication to the certain network node is derivable from the first optical communication from the certain network node.

16. The method of claim 15, wherein the performing a second routing includes transmitting the second optical communication on a different wavelength-channel than a wavelength-channel used to transmit the first optical communication during the performing a first routing.

17. The method of claim 15, wherein each performing step includes transmitting an optical communication to a network node that passively routes optical signals based on wavelength.

18. The method of claim 15, further comprising:
- determining whether the third edge node is a destination of the second optical communication based on supplementary routing data carried in the second optical communication; and
- performing a third routing of a third optical communication from the third edge node to a fourth edge node via an optical time-domain wavelength interleaved network in response to determining that the third edge node is not the destination of the optical communication.

19. The method of claim 15, wherein the supplementary data lists information indicative of the identity of a next intermediate edge node for the second optical communication.

20. The method of claim 15, wherein the first and second optical communications contain the same information.

* * * * *